March 22, 1966 J. R. OISHEI 3,241,892
WINDSHIELD WIPER LINKAGE
Filed June 11, 1962 2 Sheets-Sheet 1

INVENTOR.
JOHN R. OISHEI
BY E. Herbert Liss
ATTORNEY.

INVENTOR.
JOHN R. OISHEI
BY E. Herbert Liss
ATTORNEY.

United States Patent Office 3,241,892
Patented Mar. 22, 1966

3,241,892
WINDSHIELD WIPER LINKAGE
John R. Oishei, Buffalo, N.Y., assignor to Trico Products Corporation, Buffalo, N.Y.
Filed June 11, 1962, Ser. No. 201,594
3 Claims. (Cl. 308—26)

The present invention relates to an improved windshield pivot shaft assembly for use in a windshield wiper system, and more particularly to a vibration dampening arrangement for such an assembly.

With the advent of larger windshields, larger wiper motors and larger linkages have been required, all of the foregoing contributing to increased momentum of these parts during wiper operation. This momentum has been the cause of increased noise at wiper reversal, especially after the bearings mounting the wiper pivot shaft have experienced some wear. More specifically, the wear between the relatively movable parts of the pivot shaft assembly has resulted in looseness which causes a clicking noise at wiper reversal. This noise is telegraphed to the cowl of the vehicle which, in turn, acts as a resonant chamber which further magnifies this noise. It is with the overcoming of the foregoing probelms prevalent in vehicles having larger wiper systems that the present invention is concerned.

It is accordingly the primary object of the present invention to provide a windshield wiper pivot shaft assembly which tends to reduce noise produced by the relatively movable parts thereof.

Another object of the present invention is to provide an improved windshield wiper pivot shaft assembly which has shock absorbing qualities and therefore tends to minimize wear between the relatively movable parts thereof.

It is another object of the present invention to provide a windshield wiper pivot shaft assembly which tends to reduced noise produced by the relatively movable parts thereof even if there is a certain amount of looseness therebetween due to wear. Other objects and attendant advantages of the present invention will readily be perceived hereafter.

In accordance with the present invention, a windshield wiper pivot assembly is provided which includes a housing adapted to be secured to a body portion, as for example, the cowl of a vehicle. Mounted within the housing is a resilient vibration absorbing liner such as rubber or other sound-deadening material such as plastic. The liner supports the bearings in which the oscillatable shaft which drives the wiper arm is mounted. Because the resilient liner prevents metal to metal contact between the bearings and the inside of the housing, the noise produced by relative movement between the pivot shaft and the bearings is prevented from being transmitted to the housing. Thus the resilient liner serves to isolate such noise and prevents it from being amplified by the resonant chamber associated with the cowl or other parts of the vehicle. The resilient liner possesses shock absorbing qualities which tend to prevent excessive wear between the relatively movable parts of the wiper pivot shaft assembly because the shock produced at shaft reversal is absorbed by the liner rather than being permitted to produce wear between the relatively movable parts. Even if the bearings do wear a certain amount during operation, the resilient liner tends to isolate any noise produced by such looseness, thereby permitting the pivot shaft assembly to continue to operate silently. A preferred arrangement for the foregoing improved windshield wiper pivot shaft assembly includes means for preventing of relative movement between the bearings, liner, and housing to thereby minimize wear therebetween. The present invention will be more fully understood when the following portions of the specification are read in conjunction with the accompanying drawings wherein:

Figures 1, 2, 3, 4:
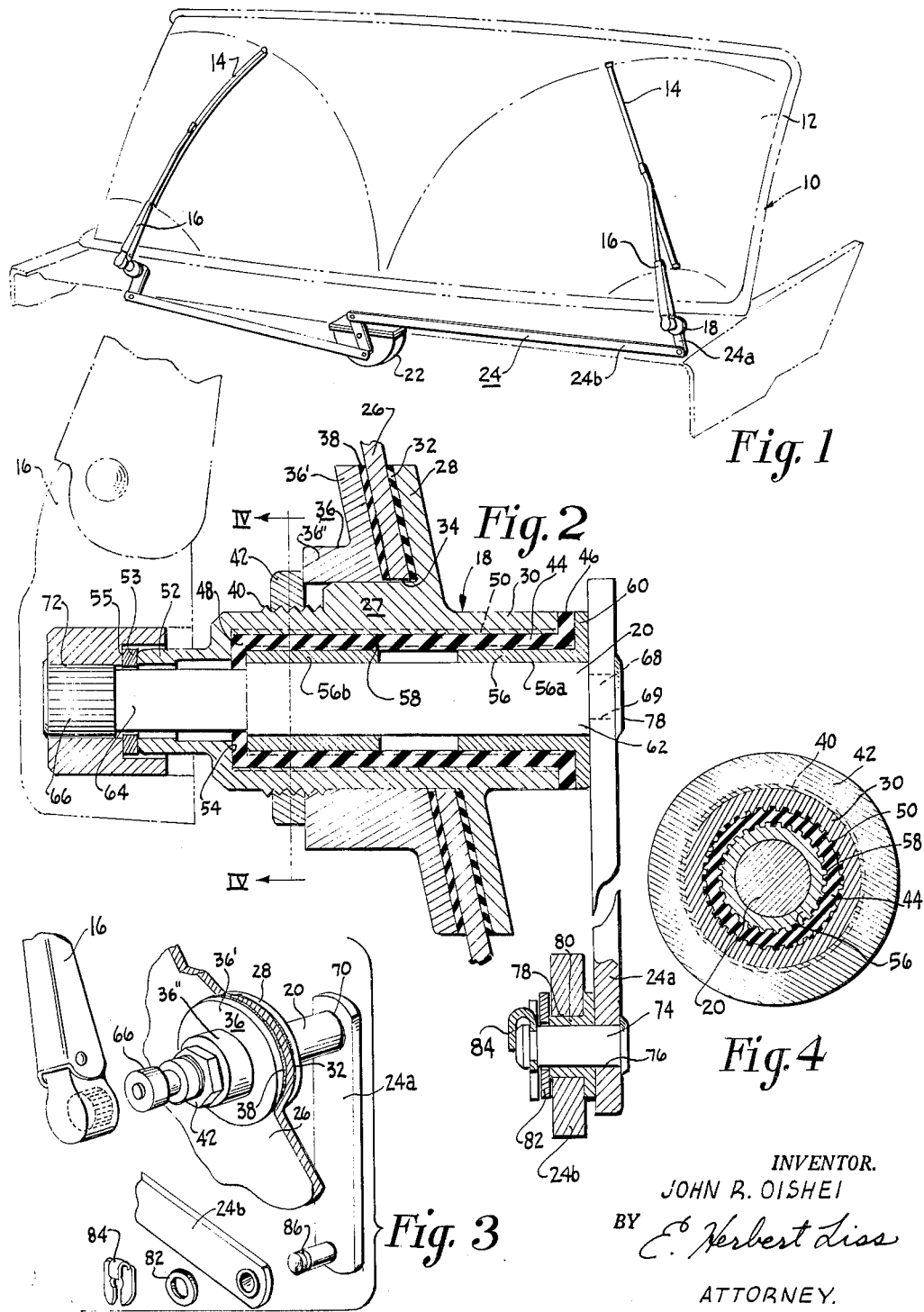
FIG. 1 is a partial view of a vehicle embodying the invention.
FIG. 2 is a longitudinal section view of the pivot shaft assembly of this invention.
FIG. 3 is an exploded perspective view of the pivot shaft assembly of this invention.
FIGURE 4 is a traverse section view taken on line IV—IV of FIG. 2 looking in the direction of the arrows.

Referring now to the drawings, FIG. 1 illustrates a partial view of a motor vehicle 10 including a windshield 12 having a pair of wipers 14, each mounted on a wiper arm 16. The wiper arms 16 are secured for pivotal movement on a shaft assembly 18. The shaft assembly includes a pivot shaft 20 which is driven in an oscillatory rotational mode by a motor 22 of any suitable type such as an electric, fluid pressure, or vacuum energized motor, through a linkage assembly 24. The pivot shaft assembly is secured to a body portion 26 of the vehicle, as for example, the fire wall or cowl.

The pivot shaft assembly 18, best shown in FIGS. 2, 3, and 4, includes a body assembly 27 having a radially extending annular flange 28 for securement to a body portion 26 of a vehicle and a cylindrical bearing housing 30. The body assembly 27 is secured to a body portion 26 of the vehicle with its flange 28 abutting the body portion 26. A gasket 32 of any suitable material, such as synthetic resin, natural rubber or synthetic rubber or other elastomers is disposed intermediate flange 28 and body portion 32. This gasket serves the dual purpose of preventing the entrance of moisture or other foreign materials through the opening 34 in the body portion 26 and also serves to absorb vibrations resulting from the operation of the wiper. A portion of the bearing housing 30 extends on each side of the opening 34 through the body portion 26. A flange 36 having a flange portion 36′ and a hub portion 36″ is received on the cylindrical housing 30. The flange portion 36′ engages the body portion 26 on the side of the body portion opposite the side which bears against flange 28. A gasket or vibration dampening pad 38, similar to the gasket or vibration dampening pad 32, is disposed intermediate the flange 36 and the body portion 26 of the vehicle 10. The portion of the bearing housing 30 extending outwardly of the body portion 26 in the direction of hub 36″ of flange 28 is threaded as at 40. A nut 42 is received on the threaded portion 40 and clampingly engages flange 36 driving the flange 36 against the body portion 26 thereby drawing the flange 28 against the opposite side of the body portion 26 to rigidly secure the housing 18 to the cowl or body portion 26 of the motor vehicle.

Disposed within the bearing housing 30 and forming a lining therefor is a cylindrical sleeve or liner 44 which may be of any suitable material which has some resiliency and is capable of absorbing vibration, such as a synthetic resin, a natural rubber or synthetic rubber or other elastomer. In the modification shown in FIG. 2 the sleeve or liner 44 may include an annular flange 46 at one end which extends radially outward from the liner and an annular flange 48 at its other end which extends radially inward. The interior surface of the bearing housing 30 is splined as at 50 to receive the exteriorly splined surface of the resilient sleeve 44. This prevents rotation of the sleeve or liner 44 relative to the bearing housing. The flange 46 abuts the end of the bearing housing 30 to prevent axial shifting of the liner 44 relative to the bearing housing 30. The bearing housing 30 includes a portion 52 of reduced interior and exterior diameter forming a shoulder 54 at the junction of the reduced portion 52 and the remainder of the bearing housing 30. The flange 48 on liner 44 abuts the shoulder 54 to further prevent axial shifting of the liner 44. A bearing 56 is received in tight fitting engagement within the liner 44. Bearing 56 includes an outer insert 56A and an inner insert 56B. Bearing 56 and liner 44 have intermeshing splines as at 58 to prevent rotation of the bearing 56 relative to the liner 44. The bearing insert 56A has at its end a flange 60 which abuts and lies coincident with the flange 46 of liner 44. This prevents axial displacement of the bearing. The bearing insert 56B abuts the flange 48 of liner 44 to retain it in axial position.

Thus it can be seen that a bearing housing is provided with a bearing received therein, but insulated from the housing by a vibration insulating or dampening sleeve 44 which prevents the transmission of sound or vibrations due to the movement of the bearing in the bearing housing which may occur upon reversal impact of a wiper arm. The vibrations are further dampened by the pads or gaskets 32 and 38 between the bearing housing 30 and its connection to a portion of the motor vehicle. This provides a compound dampening system whereby vibrations are first dampened by the sleeve 44 and any remaining vestigial vibrations are dampened by the gaskets 32 and 38. This provides relatively silent operation of the pivot shaft assembly 18. It should, of source, be understood that adequate silencing is accomplished by the liner 44 alone, but in the more specific aspects of the invention, additional silencing is accomplished by gaskets 32 and 38.

The pivot shaft 20 includes a journal portion 62 and a shaft extension portion 64 which may be of smaller diameter than journal portion 62, thereby forming a shoulder 66 intermediate the shaft extension portion 64 and journal portion 62 which bears against the inwardly extending flange 48 of sleeve 44. The shaft extension 64 may have a splined end portion 66. At the other end of the pivot shaft 20 is a reduced diameter portion 68 which is received in an opening 69 in link 24A of linkage 24. The end 70 of the shaft received in the opening 69 of link 24A may be peened over or secured to the linkage in any other suitable manner. The wiper arm 16 has at its end a pivot shaft receiving recess 72 which may be spline fitted to the splined end 66 of the pivot shaft 20. Although it is shown as spline fitted, it will of course be understood that in accordance with a broader aspect of this invention any suitable securing means may be employed. Link 24A is connected to the pivot shaft as at 70, as hereinabove described at one of its ends and is connected to a link 24A at its other end by any suitable means. As shown in FIGS. 2 and 3, the link 24A is pivoted to the link 24B on a shaft 74 received in an opening 76 of the link 24A. The shaft is suitably secured to the link 24B in any suitable manner as, for example, by peening the end as shown in FIG. 2. Link 24B has an opening 78 which is lined with a grommet bearing 80 in which shaft 74 is journalled. The shaft is secured in its journal 80 by any suitable means as, for example, a washer 82 and a split nut 84 received in a neck portion 86 adjacent the end of shaft 74. This connection can best be seen in the exploded view of FIG. 3.

A washer 53 of resilient material is received on the shaft extension 64 of pivot shaft 20 and lies intermediate the end of the reduced diameter portion 52 of the bearing housing and a shoulder portion 55 circumscribing the recess 72 of the wiper arm 16. This prevents metal to metal contact of the bearing housing with the wiper arm.

Figure 5:
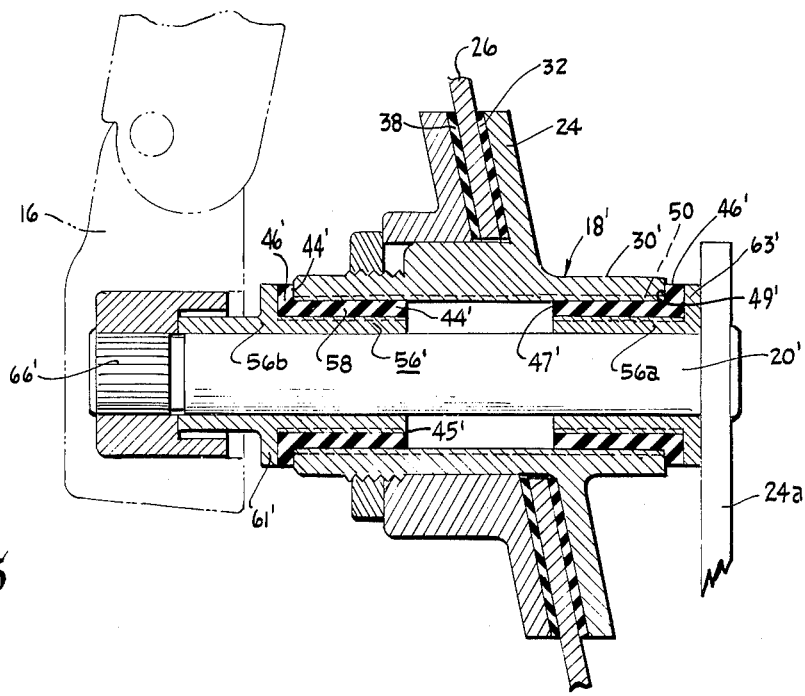
FIG. 5 is a longitudinal section view similar to FIG. 2 illustrating a modified form of the pivot shaft assembly of this invention.

A modification of the pivot shaft of this invention is shown in FIG. 5. Like reference numerals will be used to identify identical parts and only those portions which are materially different from the modification shown in FIG. 2 will be described in detail. In the FIG. 5 modification a bearing housing 18' includes a flange portion 28 and a cylindrical bearing housing portion 30' which is secured to a body portion 26 of a motor vehicle in a manner identical to the FIG. 2 modification and includes the insulating gaskets or pads 32 and 38. The body portion 30' is substantially cylindrical and of constant diameter over its entire range. A two part insulating sleeve or liner 44' having a section 45' and a section 47' is provided. The portions 45' and 47' are spline fitted as at 50 within the bearing housing 30'. The liner sections 45' and 47' each have an outwardly extending annular flange 46' at their outer ends which form a shoulder 49' on the outer surface of each of the sections 45' and 47'. The shoulders 49' abut the respective ends of the bearing housing 30'. A bearing 56' having an insert 56A' and a part 56B' are spline fitted as at 58 within the liner 44'. A pivot shaft 20' is journalled within the bearing 56' and is secured to link 24A as in the FIG. 2 modification. The wiper arm 16 is spline fitted or secured in any other suitable manner to a spline shaft extension 66' for rotation with the pivot shaft 20'. The bearing insert 56A' has an annular radially outwardly extending flange 61' which abuts the side of the flange 46' on the insulating sleeve 44' remote from the side of the flange 46' adjacent the end of bearing housing 30'. The bearing insert 56B' has an annular flange 63' at its outer end which lies intermediate the link 24A and an adjacent flange 46' of the insulating sleeve part 47' in abutting engagement with the adjacent parts.

In this modification the outwardly extending flange 46' on the vibration insulating sleeve 44' insulates the bearing housing 30' against transmission of vibrations from wiper arm 16 to the bearing housing and eliminates the necessity for a vibration insulating washer 53 as provided in the FIG. 2 modification.

It will now be apparent that a windshield wiper pivot shaft assembly has been provided in which the vibrations due to relative movement between the pivot shaft and the bearing are dampened. In a further and more specific aspect of the invention, a compound dampening is effected with a further provision of vibration dampening between the body portion and the portion of the pivot shaft assembly secured thereto. This is accomplished by a novel and unique construction which includes resilient vibration dampening material disposed at the bearing housing.

Although certain specific embodiments of the invention have been shown and described for the purpose of illustration, it will of course be understood that in its broadest aspect other and different embodiments of the invention may be employed, together with certain changes and modifications of the specific structure described as, for example, in a broader aspect of the invention, the vibration insulating sleeve or liner 44' may be of other shapes and materials not included within the description hereof and the location and positioning of this element may be varied. Other modifications may also be included within the scope of the invention.

While I have described preferred embodiments of the present invention, I desire to be understood that it is not to be limited thereto, but may otherwise be embodied within the scope of the following claims.

What is claimed is:

1. In a windshield wiper pivot shaft assembly, a compound vibration dampening bearing structure comprising a housing, means on said housing for securing said housing to a body portion of a vehicle, a vibration absorbing pad interposed intermediate said securing means and said body, bearing means disposed within said housing, a vibration absorbing liner disposed intermediate opposing surfaces of said bearing means and the adjacent housing wall and a pivot shaft journalled in said housing, cooperating means on said liner, said housing, said bearing and said pivot shaft to prevent relative axial movement therebetween and means to prevent relative rotational movement between said bearing, said housing and said liner, whereby the shock resulting from relative movement between said pivot shaft and said bearing means is absorbed to prevent transmission of sound to the interior of the vehicle and to prevent wear due to moving contact between adjacent metal parts.

2. A windshield wiper pivot shaft assembly comprising a housing, means for securing said housing to a body portion of the vehicle, a pivot shaft within said housing, unitary bearing means for supporting said pivot shaft, resilient liner means for supporting said bearing means in said housing, spline means for interengaging said resilient liner means and said housing means to prevent relative rotational movement therebetween, a radially extending shoulder on said pivot shaft and cooperating radial flanges on said bearing, said housing, and said liner to prevent relative axial movement between said pivot shaft said bearing, said liner and said housing.

3. A windshield wiper pivot shaft assembly comprising a housing, means for securing said housing to a body portion of the vehicle, a pivot shaft within said housing, unitary bearing means for supporting said pivot shaft, resilient liner means for supporting said bearing means in said housing, spline means for interengaging said resilient liner means and said bearing means to prevent relative rotational movement therebetween, a radially extending shoulder on said pivot shaft and cooperating radial flanges on said bearing, said housing, and said liner to prevent relative axial movement between said pivot shaft said bearing, said liner and said housing.

References Cited by the Examiner

UNITED STATES PATENTS

| | | | |
|---|---|---|---|
| 1,758,712 | 5/1930 | Morris. | |
| 1,851,561 | 3/1932 | Baninger | 308—26 |
| 1,861,081 | 5/1932 | Foresman | 308—26 X |
| 1,964,400 | 6/1934 | Horton | 15—250.31 |
| 1,993,260 | 3/1935 | Burns | 287—85 |
| 2,166,259 | 7/1939 | Meyer | 308—26 |
| 2,461,643 | 2/1949 | Hemmeter. | |
| 2,642,318 | 6/1953 | Ricks | 308—26 |
| 3,000,657 | 9/1961 | Boschi | 287—85 |

FOREIGN PATENTS

| | | |
|---|---|---|
| 12,514 | 5/1897 | Great Britain. |
| 609,343 | 9/1960 | Italy. |

DON A. WAITE, *Primary Examiner.*

FRANK SUSKO, ROBERT C. RIORDON, *Examiners.*